United States Patent [19]
Kiselman et al.

[11] 3,727,126
[45] Apr. 10, 1973

[54] PROFILOGRAPH FOR EXAMINING PIPES IN OIL WELLS

[75] Inventors: Mark Lazarevich Kiselman; Mikhail Borisovich Shots; Viktor Petrovich Larin, all of Grozny, U.S.S.R.

[73] Assignee: Severo-Kavkazsky Neftyanol Nachno-issledovatelsky, Grozny, U.S.S.R.

[22] Filed: Sept. 11, 1970

[21] Appl. No.: 71,608

[52] U.S. Cl. .......................... 324/34 R, 324/6, 166/250
[51] Int. Cl. ................................................. G01r 33/00
[58] Field of Search ...................... 324/34 R, 37, 6; 166/65 M, 250, 255

[56] References Cited

UNITED STATES PATENTS

| 2,527,170 | 10/1950 | Williams | 324/34 R |
| 2,684,464 | 7/1954 | Hastings et al. | 324/34 R |
| 2,866,155 | 12/1958 | Martin | 324/37 |
| 2,870,541 | 1/1959 | Mayes | 324/34 R |
| 2,878,447 | 3/1959 | Price et al. | 324/37 |
| 3,079,549 | 2/1963 | Martin | 324/6 |

Primary Examiner—Robert J. Corcoran
Attorney—Waters, Roditi, Schwartz & Nissen

[57] ABSTRACT

A device for determining the wear of casing pipes in wells, comprising an exploration unit having a housing wherein there is mounted a pickup transformer fed from an a.c. source and connected to a recorder. The characteristic features of the invention consist in that at the place of the pickup location the housing of the exploration unit has in its central part a channel to let through the drilling mud, while the pickup transformer is connected with a drive for its rotation. The device measures the pipe wall thickness, the ovality thereof, and the shape of wear in the pipe so as to provide measurement of the residual strength of the pipe.

4 Claims, 5 Drawing Figures

PROFILOGRAPH FOR EXAMINING PIPES IN OIL WELLS

The invention relates to devices for determining the wear of casing pipes in wells.

In drilling deep wells the casing pipes in the wells are subject to intense wear due to the large volume of operations in these pipes, which involves quite costly breakdowns. Modern information as to the condition of the casing column permits the drilling work to be executed with less expenses.

Known in the art is a device, i.e., an electronic inside caliper, for determining the wear of casing pipes in wells, comprising an exploration unit disposed within the column of the pipes to be investigated, the housing of this unit accomodating a pickup transformer fed from an a.c. source and connected to a recorder of the quantities being measured, which recorder is fitted with an attachment for checking the depth of the exploration unit (see, for example, the U.S. Pat. No. 3,417,325, cl. 324–34).

In the exploration unit of this device, which is held within the column of pipes to be explored, there is mounted a non-rotary pickup. This pickup has a cylindrical core disposed coaxially with the pipe being explored. Located on an insulator coaxially with the pickup cylinder are two coils axially displaced with respect to each other. One of these, i.e., the exciter coil, is fed by a.c. current with a frequency of between 10 and 50 kc. The pickup coil is coupled through a rectifier to a recorder held on the ground surface.

This conventional device makes possible determining the average inside diameter of the pipe. But these data are insufficient to determine the wear of pipes. Therefore this device is usually employed together with other instruments, such as a corrosion detector, which indicates the average thickness of the pipe wall.

However, for determining the residual strength of the pipe it is necessary to know not only the average inner pipe diameter and its average wall thickness, but the ovality of the pipe and the shape of its wear as well. Such information on pipe wear is not given by the conventional instruments despite the complexity of their design.

The housing of the exploration unit in the conventional device has a continuous structure extending about the pickup, which adversely affects the passage of the instrument in the well, decreases the efficiency of the device (i.e., the rate of measurements taking), and increases the number of stops of the instrument in the well. Additionally, the continuous structure of the housing of the exploration unit makes it impossible to bring the pickup close to the column of pipes being researched, for taking measurements, which reduces the operational accuracy of the device.

An object of the present invention is to provide a device to determine the wear of well pipes, and which would permit checking the ovality of the pipe under exploration.

Another object of the present invention is to provide a device to determine the wear of well pipes, that would enable assessing the shape of wear of the pipe.

Still another object of the invention is to provide a device to determine the wear of pipes, that would make possible estimating the residual strength of the pipe.

With the foregoing and other objects in view, proposed herein is a device for determining the wear of well pipes, comprising an exploration unit disposed within the column of pipes to be investigated, the housing of this unit accomodating a pickup transformer fed from an a.c. source and connected to a recorder of quantities being measured, which recorder is fitted with an attachment for checking the sinking depth of the exploration unit. According to the invention, in the place of the pickup position the unit housing has in its central part a hole for passing through the drilling mud, while the pickup is connected with a drive to rotate it.

It is preferable to also provide an additional recorder synchronized with the pickup rotation, in order to record the coordinates of the inner peripheral points of the pipe cross-sectional profile with respect to the center line of the exploration unit.

It is also preferable to use a synchronous motor as the pickup rotation drive.

As a result of the present invention, a device has been developed that enables an exact inner profile of the pipe cross section to be obtained, whereby any of the inner diameters of the pipe, its ovality, depth, width, and its shape of wear, can be determined. From these data one can judge the causes of the pipe damage, as well as more accurately assess its residual strength, which permits precluding a breakdown, and taking a correct decision as to the further execution of drilling work.

The invention is now exemplified with an embodiment thereof and the drawings, wherein:

FIG. 3 is section III—III in FIG. 2;

Figure 1:
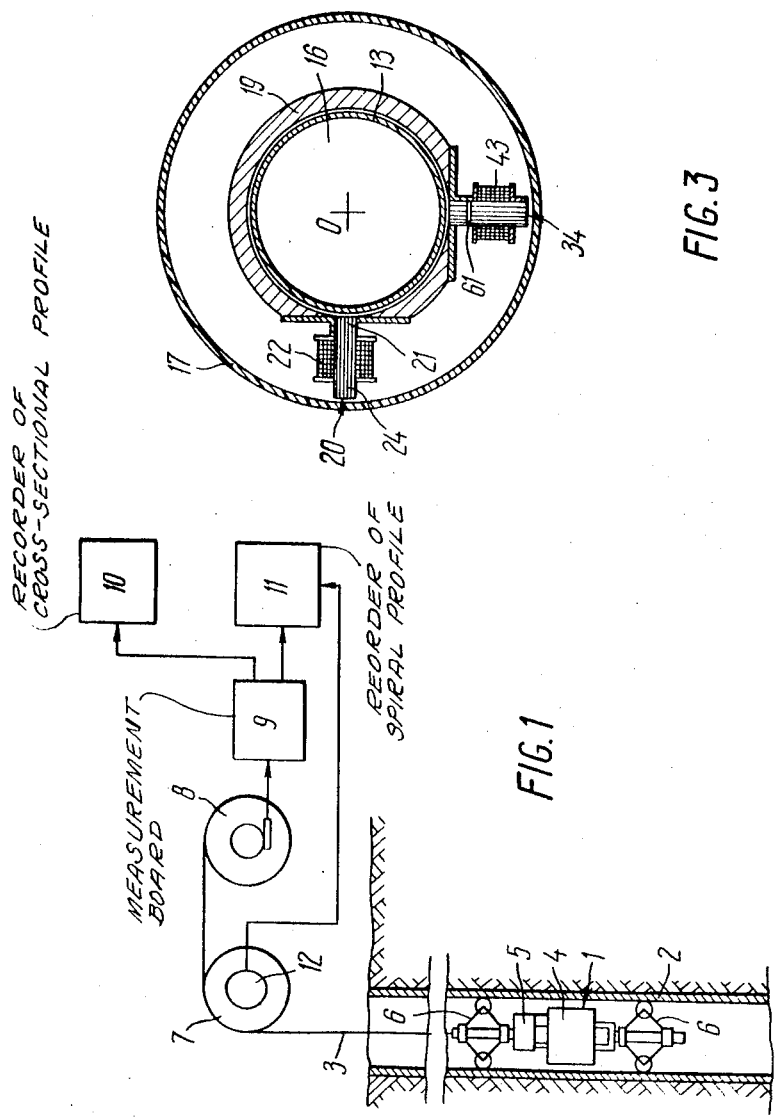
FIG. 1 is a schematic illustration of the device for determining the wear of well pipes.

Schematically shown in FIG. 1 is the device to determine the wear of well pipes, comprising an exploration unit 1 sunk into the column of pipes 2 by the logging cable 3. The exploration unit has a pickup section 4 and a motor section 5 which are connected together, and is provided with top and bottom centralizers 6. The logging cable 3 emerging on the ground surface through a balance pulley 7 and wound on the logging winch 8 connects the exploration unit to a measurement board 9. The output of the measurement unit 9 is coupled to a recorder 10 for the cross-sectional profile, and to a recorder 11 for spiral profile. The balance pulley 7 is fitted with a transmitting selsyn 12 which checks the depth of sinking of the exploration unit 1. The transmitting selsyn 12 is connected to recorder 11 of spiral profile. The auxiliary instruments of the device, including the instruments for power supply, signalization, speaking, the depth checking panel, are not shown in the figure.

Figure 2:
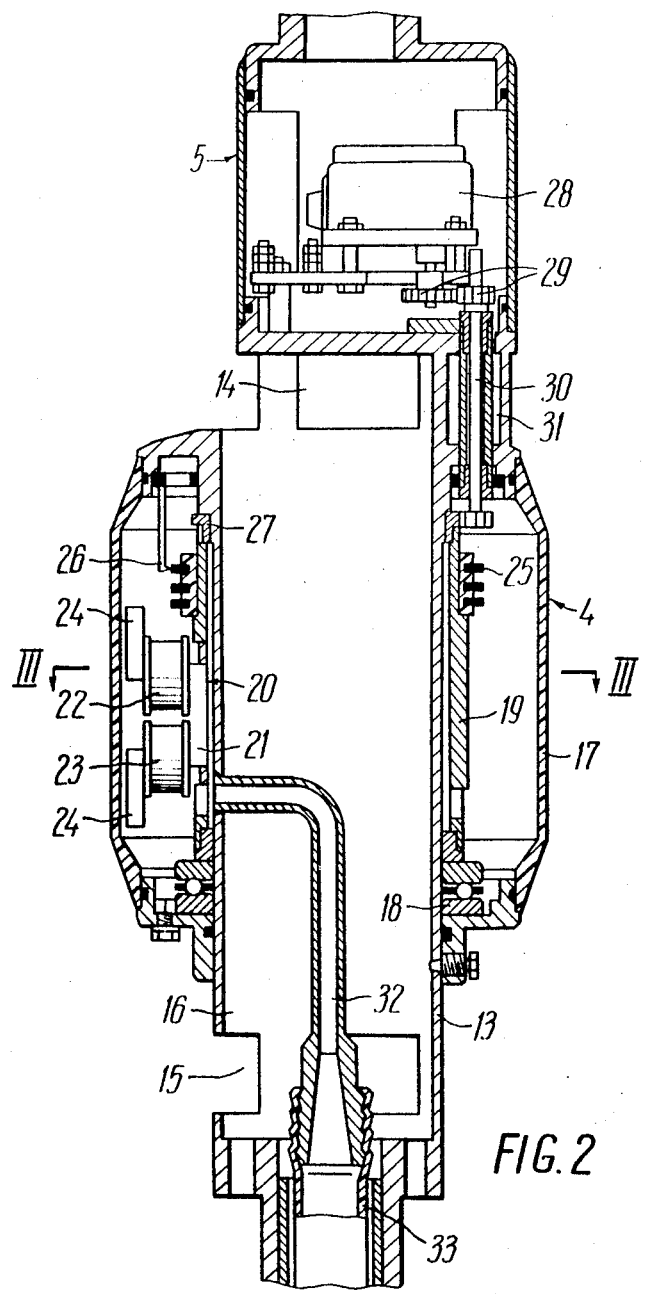
FIG. 2 shows part of the exploration unit with the pickup of the device made according to the invention.

The exploration unit 1 comprises a housing 13 (FIGS. 2,3) having the form of a tube of varying cross-section with holes 14 and 15 (FIG. 2) and a channel 16 (FIGS. 2,3) to let through the drilling mud. Located between holes 14 and 15 is the pickup section 4 inside which passes said channel 16. The pickup section 4 has a casing 17. The casing is made of dielectric material, for example glass tectolite, or possibly of diamagnetic material, for instance, stainless steel with high specific electric resistance. Mounted inside the pickup section 4 on a bearing 18 is a holder 19, which is made as a collar. Disposed on holder 19 is an induction pickup transformer 20 including a core 21, two coils 22, 23, and pole terminals 24.

For the electric connection of the windings of coils 22 and 23 with the other elements of the electric circuit, on holder 19 there are provided slip rings 25 (FIG.2) which are electrically insulated from holder 19. Contacting rings 25 are electric brushes 26 insulated from housing 13. In order to impart to holder 19 and pickup 20, rotational movement about the center line 0—0, the holder has a toothed rim 27.

In the motor section 5 there is located a synchronous electric motor 28 which, through a gear system 29, a shaft 30, and the toothed rim 27, drives holder 19. The gear system 29 with axle 30 and the toothed rim 27 forms a reducer, wherein the number of gears, their size and disposition may vary according to the particular conditions.

The pickup section 4 and the motor section 5 are filled with dielectric fluid, and are connected together by channel 31. The pickup section 4 is through a knee pipe 32 connected with a pressure compensator 33 made in the form of rubber bellows. Located in the same sections 4 and 5 are a reference-voltage transformer 34 (FIG. 3), as well as resistors and other elements of the electric circuit that are not shown in FIGS. 2,3 (there may be no special motor section in exploration units for measuring large-diameter pipes, and with the electric motor, reducer, and other elements of this section being located in the pickup section).

All the electric circuit elements held on the ground surface, except for recorders 10 and 11, are located on the measurement unit 9. All the elements disposed below the ground surface are positioned within the exploration unit 1.

Figure 4:
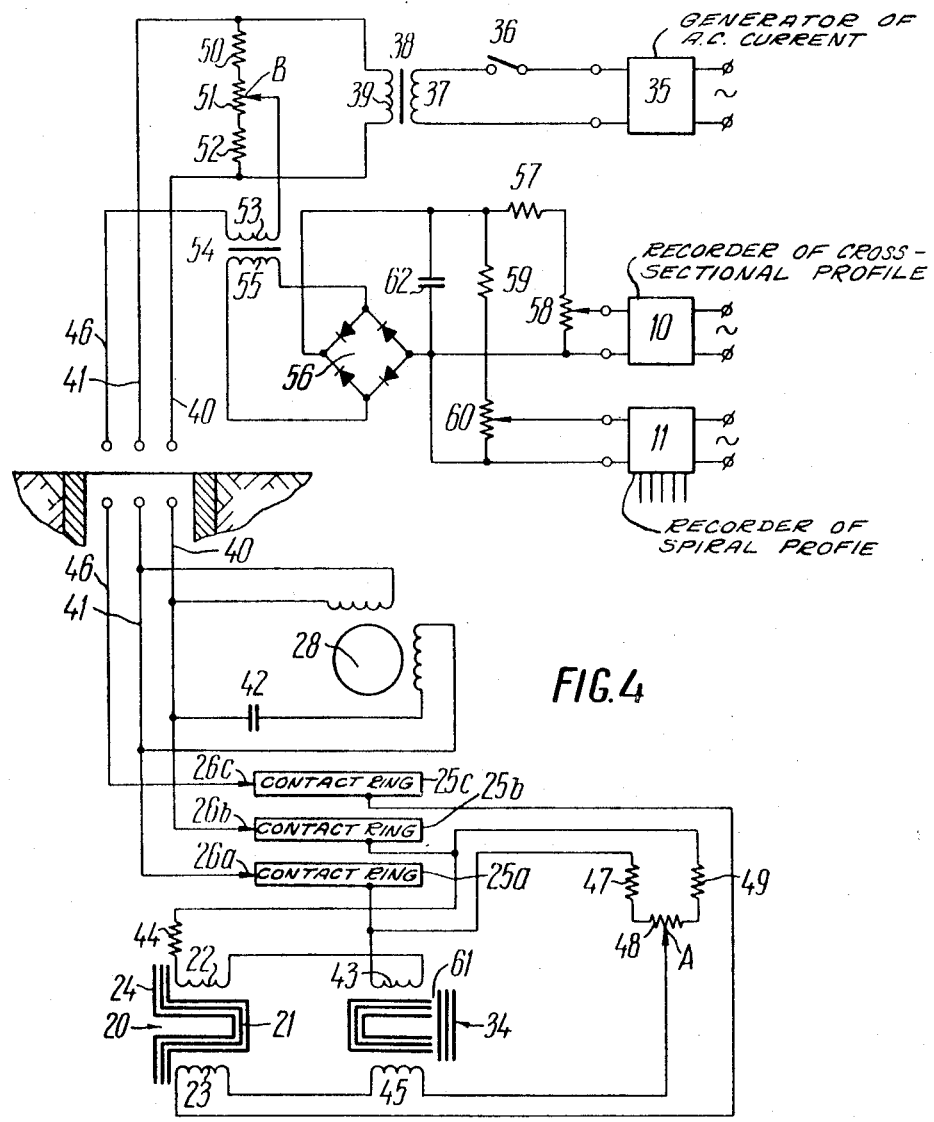
FIG. 4 shows the electric circuit of the device according to the invention.

A generator 35 (FIG.4) of a.c. current is through a switch 36 connected to the primary winding 37 of an insulating transformer 38. (Employed as generator 35 may be an industrial frequency power line. In this case there will be no such generator in the circuit). The secondary winding 39 of the insulating transformer 38 is connected to conductors 40 and 41 of the logging cable 3. Connected to conductors 40 and 41 within the exploration unit 1 is the synchronous electric motor 28. Used for the purpose of phase splitting is a capacitor 42 wherethrough one of the windings of motor 28 is connected. These same conductors 40 and 41 are through brushes 26a and 26b and slip rings 25a and 25b coupled to the primary winding 22 of pickup 20, and to the primary winding 43 of the reference-voltage transformer 34. These windings are series-connected (although they may as well be connected in parallel). Included in the circuit of windings 22 and 43 is an additional resistor 44. (The windings may be wound of a high-resistance wire, thus obviating the need for resistor 44). The secondary winding 23 of pickup 20 is placed in series with the secondary winding 45 of the reference-voltage transformer 34. The ends of windings 23 and 45 are connected so, that the voltages are subtracted. The obtained voltage is through a phantom circuit of the logging cable 3 fed to the ground surface. (This voltage may as well be delivered through a frequency converter. In the latter case a single-core cable can be employed for the operation of the device).

The phantom circuit is formed by a conductor 46 and conductors 40 and 41 of cable 3. With this purported use in the exploration unit are resistances 47,48, and 49 with a tapping point A, while in the measurement board 9 on the ground surface there are provided resistances 50,51, and 52 with a tapping point B.

All these resistances may be active, as well as reactive. In the measurement unit 9 the phantom circuit is coupled to the primary winding 53 of a matching transformer 54. Conductor 46 is connected to the secondary winding 23 of pickup 20 through brush 26c and the slip ring 25c. The secondary winding 55 of the matching transformer 54 is connected to a rectifier 56. The d.c. output of rectifier 56 is through a nonlinear resistance 57 and an attenuator 58 coupled to the input of recorder 10 of the cross-sectional profile. The output of rectifier 56 is also coupled to recorder 11 of the spiral profile through a nonlinear resistance 59 and an attenuator 60. Recorder 11 is similarly connected with the depth transmitting selsyn 12.

The proposed device works as follows.

The a.c. voltage from generator 35 is through transformer 38 and conductors 40 and 41 of the logging cable 3 fed to the synchronous motor 28. Motor 28 brings into rotation holder 19 together with pickup 20. The same voltage is supplied through brushes 26a and 26b and rings 25a and contact 25b to winding 22 of the pickup, and winding 43 of the reference-voltage transformer 34. The electromotive force in the secondary winding 23 of pickup 20 depends upon the distance between the wall of the column of pipes 2 and the pickup pole terminal 24.

As this distance increases, the voltage drops. The voltage obtained across winding 23 is subtracted from the voltage of the secondary winding 45 of the reference-voltage transformer 34. This voltage, called reference voltage, is set so, that its amplitude and phase be equal to the voltage amplitude and phase in the secondary winding 23 of pickup 20 as the wall of pipe 2 contacts casing 17. The effective value of the reference voltage across winding 45 of this transformer 34 does not change. The resultant voltage after subtraction is a function of the distance from the wall of the column of pipes 2 to pickup 20. With the growth of the distance this voltage rises. By varying the size of the pole terminals 24, the distance between them, the width of the diamagnetic clearance 61 (FIGS. 3,4) in the well as other parameters, it is possible obtaining a sufficiently linear relationship between this voltage and the distance within the tool operating site. This resultant voltage arrives at the primary winding 53 of the matching transformer 54 through the phantom circuit of conductors 40 and 41 of cable 3 and conductor 46 of this cable. In the matching transformer 54 the voltage is transformed, and from the secondary winding 55 it arrives at rectifier 56. Used in the output of rectifier 56 is a filter in the form of a capacitor 62 (FIG.4) placed in parallel with the output of rectifier 56. Then the resultant voltage is through attenuators 58 and 60 fed to recorders 10 and 11. To widen the working range of measurements, included in the attenuators circuit are the non-linear resistances 57 and 59. (If required, added to the circuit may be signal enhancers).

Recorder 10 makes the record when the exploration unit is immovable. The movement of the chart of recorder 10 is synchronized with the pickup rotation due to the fact that both the chart and the pickup are driven by synchronous motors which are simultaneously fed from one a.c. source. This record is made on a disk chart, but it can equally be performed on a tape chart. This recorder marks the coordinates of the inner peripheral points of the cross-sectional profile of the pipe under investigation, with respect to axis 0—0 of the exploration unit. Determined by these coordinates may be the true profile of the pipe, its inner diameters and ovality, as well as the depth, width, and the shape of wear of the pipe. Recorder 11 is an ordinary recorder, whose chart is by conventional means, say by selsyn coupling, moved in synchronism with the vertical movement of the exploration unit. The chart of recorder 11 reflects the spiral profile of the column of pipes 2.

Thus, in recorder 11 the record is made through spiral scanning. The greater the speed of the pickup rotation, and the less the rate of movement of the exploration unit in the casing column, the more detailed is the investigation of the latter. Experience proves that a scanning pitch of 0.5 m is usually sufficient to reveal the main damages in the pipe column.

The casing column can be investigated both by sinking or lifting the exploration unit. The unit is stopped in order to obtain an exact internal cross-sectional profile of the pipe.

Figure 5:
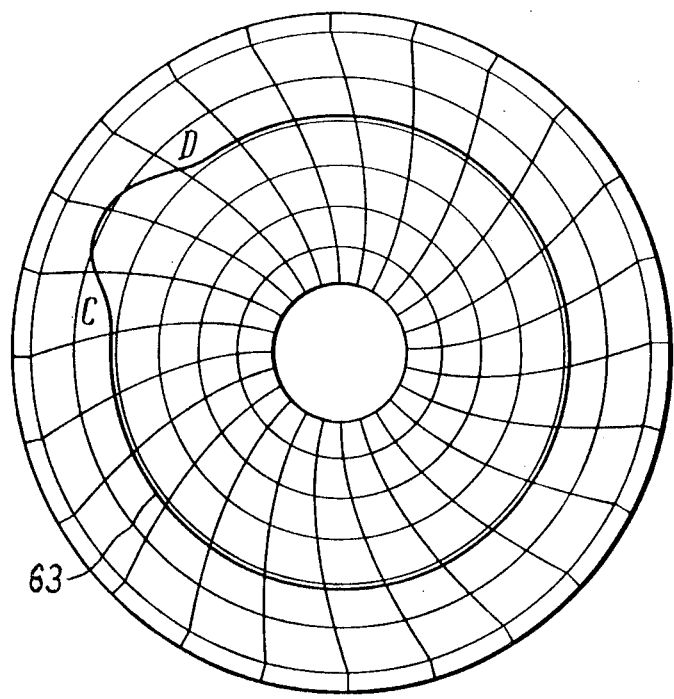
FIG. 5 is the record chart of the cross-sectional profile of the casing.

Line 63 in FIG. 5 gives an example of recorded coordinates of the inner peripheral points at a cross-sectional profile of a column with an outer diameter of 324 mm, the wear having the shape of a channel made by the drill pipe joints. The worn pipe section is shown on this line 63 between points C and D.

Before sinking the exploration unit into the pipe column to be investigated the unit is calibrated, and a calibration curve is plotted, which is used in the office study of the charts to determine the true dimensions of wear.

What we claim is:

1. Apparatus for the continuous and remote recording of sizes and shapes of cross-sections of columns of casing pipes extending into wells below ground comprising; a source of alternating current located on the surface of the ground; an exploration unit fastened to a logging cable, said exploration unit being lowered and raised within said column of casing pipes by said cable; a measurement unit including an electric circuit mounted on the ground surface and being connected to said exploration unit by said logging cable and having current supplied thereto from said alternating current source; a recorder for cross-sectional profile diagrams having an input connected to the output of said measurement unit and including a synchronous motor connected to said alternating current source for effecting movement of the diagram of said recorder; a recorder for a spiral profile having an input connected to the output of said measurement unit and including means for moving the diagram synchronously with the movement of said exploration unit; said exploration unit comprising a non-magnetic casing, a reference-voltage transformer, a rotary transformer pickup, a current collector in the form of slip rings, a synchronous motor including speed reduction means by means of which said transformer pickup is rotated about the longitudinal axis of this exploration unit; said pickup having a primary and a secondary winding formed about a U-shaped core with pole terminals separated from each other and facing the wall of said column of casing pipes; said reference-voltage transformer having a U-shaped core including a primary and a secondary winding, said transformer including an adjustable armature adjacent the poles of the core enabling adjustment of the diamagnetic clearance between said core and the armature; the primary windings of said pickup and of said reference-voltage transformer being wound with a high-resistance wire and connected in series and via said slip rings to the conductors of said logging cable, and the measurement unit to said a.c. source; the secondary windings of said pickup and reference-voltage transformer having opposing connection and being connected to said measurement unit via said slip rings and the phantom circuit of the cable; said measurement unit comprising a matching transformer with a primary winding connected via the phantom circuit of the cable to said secondary windings of the pickup and reference-voltage transformer, and a rectifying bridge being connected to the secondary winding of said matching transformer and delivering signals to said recorders.

2. Apparatus as claimed in claim 1, comprising a longitudinal channel in said exploration unit for passing drilling mud.

3. Apparatus as claimed in claimed 1, comprising a selsyn connection for moving the diagram of the spiral profile recorder, said selsyn connection comprising a balance-pulley roller through which said logging cable is passed, a transmitting selsyn mounted on said roller, and a drive for said diagram including a receiving selsyn connected to said transmitting selsyn.

4. Apparatus as claimed in claim 1, said measurement unit having connected thereto a non-linear resistance with a dropping voltage-resistance characteristic, said resistance being between said rectifying bridge and the connection to the recorders.

* * * * *